March 29, 1966     J. J. FRY     3,242,756
VALVE ACTUATORS
Filed May 10, 1965
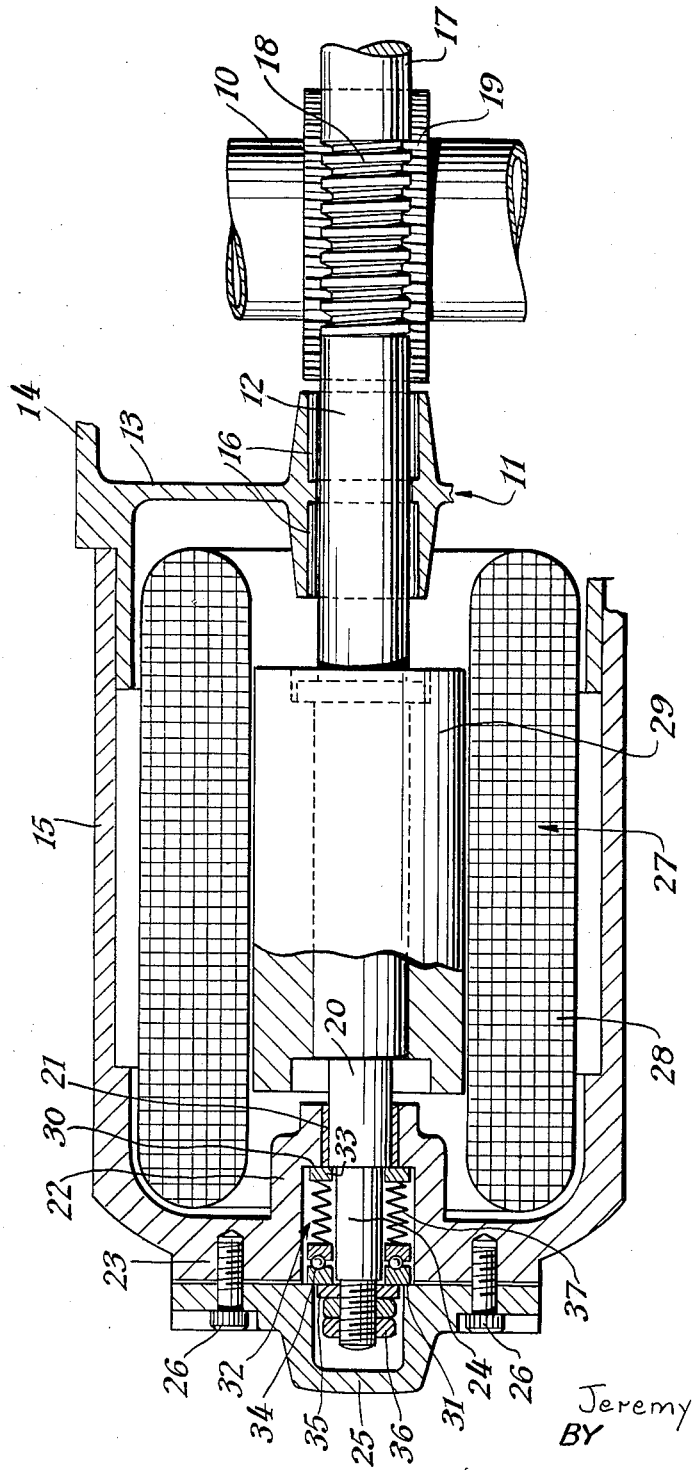
INVENTOR
Jeremy Joseph Fry
BY
Stevens, Davis, Miller & Mosher, ATTORNEYS

United States Patent Office 3,242,756
Patented Mar. 29, 1966

3,242,756
VALVE ACTUATORS
Jeremy Joseph Fry, Bath, Somerset, England, assignor to Rotork Engineering Company Limited, Bath, Somerset, England, a British company
Filed May 10, 1965, Ser. No. 454,368
Claims priority, application Great Britain, Feb. 28, 1961, 7,344/61
2 Claims. (Cl. 74—425)

This invention relates to valve actuators. The present application is a continuation-in-part of application Serial No. 175,769, filed February 26, 1962, now Patent No. 3,198,033, which application describes a valve actuating mechanism of the kind incorporating a drive mechanism by which the valve spindle or output shaft of the actuator may be selectively operated either manually i.e. by rotation of the customary handwheel or by power means such as an electric motor.

The present invention is concerned with the motor driving shaft assembly and an object of the invention is to provide an assembly in which the mechanical parts are greatly simplified and the overall length is greatly reduced.

The power drive mechanism for the actuator comprises a driving shaft operable by a reversible electric motor which is mounted in a motor casing extending from the main casing of the actuator. The driving shaft of the motor extends into the main casing of the actuator and the drive is transmitted to the valve spindle or output shaft of the actuator by means of a worm and wormwheel. The worm is mounted directly on the motor shaft within the actuator main casing and it meshes with the wormwheel which is located on the main shaft of the actuator which shaft is disposed at right angles to the motor shaft.

According to the invention there is provided a valve actuator comprising a main casing having a partition wall adjacent a region where it supports a motor casing, a reversible electric motor mounted in said motor casing, said electric motor including a driving shaft assembly comprising a shaft extending through said partition wall and supported at one end in an end bearing in the end wall of the motor casing and at a position intermediate its ends in a bearing in said partition wall, the other end of said shaft extending into main casing and being unsupported therein, and a worm directly mounted on the unsupported end of the driving shaft in the main casing.

The motor driving shaft assembly as set out above considerably reduces the overall length of the mechanical parts due to the location of the main support bearing between the worm and the electric motor.

In the preferred embodiment of the invention axial movement of the motor shaft in either direction is permitted by providing a double-acting resilient device in the form of a pack of Belleville washers which is retained on the shaft between the motor and the remote end wall of the motor casing. The axial movement of the motor shaft is utilised to operate torque switches controlling the operation of the motor and these switches may form part of a control unit operable by the end of the shaft on which the worm is mounted.

In the preferred form of actuator the worm meshes with a wormwheel which is mounted on the main or output shaft of the actuator, which latter shaft is disposed at right angles to the motor shaft.

In order that the invention may be clearly understood the preferred embodiment will now be described with reference to the accompanying drawing, the single figure of which is a diagrammatic illustration of an actuator in accordance with the invention.

The constructional features of the actuator mechanism are not shown in the drawing but they form part of the parent application Serial No. 175,769 to which reference should be made for details of the construction and operation of the actuator.

The output shaft of the actuator is shown by the reference 10 and as explained in application Serial No. 175,769 this shaft may be selectively operated either manually i.e. by rotation of the customary handwheel or by power means such as an electric motor.

The present invention is concerned with the power operation of the output shaft 10 and this comprises a motor driving shaft assembly shown generally by the reference 11. The assembly comprises a shaft 12 which is mounted at right angles to the output shaft 10 and which extends through a partition wall 13 in the actuator main casing 14. The driving shaft 12 is therefore supported intermediate its ends in bearings 16 mounted in the partition wall 13.

The end 17 of the driving shaft 12 projecting into the main casing 14 is overhung or unsupported and a worm 18 is mounted directly on the end 17 of the shaft and drivably meshes with a wormwheel 19 on the output shaft 10.

The other end 20 of the driving shaft 12 extends into a motor casing 15 and is supported adjacent its end in a bearing 21 in a cup-shaped section 22 formed in the end wall 23 of the motor casing 15. The end 20 of the driving shaft 12 is formed with an axial extension 24 of reduced diameter for a purpose to be hereinafter described and the motor casing 15 is completed by a plate 25 which is secured to the end wall 23 of the casing by a plurality of bolts 26.

A reversible electric motor 27 is mounted within the casing 15 and the motor includes a stator 28 and a rotor 29 directly mounted on the driving shaft 12.

The reduced end portion 24 of the driving shaft 12 is provided with a double-acting resilient device which is retained on the shaft between the inner wall 30 of the cup-shaped section 22 and a surface 31 of the end plate 25. The resilient device is shown generally by the reference numeral 32 and its function is to permit axial movement of the driving shaft 12 in either direction in response to a predetermined torque due to resistance to movement of the output shaft 10 of the actuator. Assuming resistance to movement, for example during closing movement of the valve, the driving shaft 12 would move axially and this movement is utilised to operate torque switches controlling the circuit of the motor 27, which torque switches may form part of the control unit operable by the end 17 of the driving shaft 12. Such a control unit is described in greater detail in my allowed copending application Serial No. 197,183, filed May 21, 1962, now Patent No. 3,209,090, to which reference should be made for further details.

The double-acting resilient device 32 includes a pack of Belleville washers and the arrangement comprises a thrust plate 33 which engages the wall 30 of the cup-shaped section 22 and also the end shoulder formed on the end 20 of the driving shaft 12. A thrust bearing 34 engages the surface 31 of the end plate 25 and also a thrust plate 35 secured in position on the end 24 of the shaft by lock nuts 36. The pack of Belleville washers 37 is mounted between the thrust plate 33 and the thrust bearing 34 and the arrangement is such that movement of the shaft in either direction will compress the pack of Belleville washers between a portion of the shaft and a fixed part of the casing 15. The single spring assembly therefore controls the axial movement of the shaft 12 in either direction and this greatly reduces the overall length of the motor driving shaft assembly.

It will be appreciated that the invention greatly simplifies the construction of the driving shaft assembly for the actuator electric motor. At the same time the overall length of the mechanical parts is considerably reduced which thereby enables the design of the actuator to be greatly simplified. The driving shaft assembly is supported in only two bearings with the driving worm overhung.

I claim:

1. A valve actuator comprising a main casing having a partition wall adjacent a region where it supports a motor casing, a reversible electric motor mounted in said motor casing, said electric motor including a driving shaft assembly comprising a shaft extending through said partition wall and supported at one end in an end bearing in the end wall of the motor casing and at a position intermediate its ends in a bearing in said partition wall, the other end of said shaft extending into said main casing and being unsupported therein, and a worm directly mounted on the unsupported end of the driving shaft in the main casing said shaft being axially movable in either direction, a double acting resilient device operable between said one end of the shaft and the end wall of the motor casing.

2. A valve actuator as claimed in claim 1, in which the worm meshes with a wormwheel mounted on an output shaft of the actuator, the latter shaft being located at right angles to the driving shaft.

References Cited by the Examiner

UNITED STATES PATENTS

| | | | |
|---|---|---|---|
| 2,052,674 | 9/1936 | Symonds | 74—425 |
| 2,351,060 | 6/1944 | McLauthlin | 74—425 |

DAVID J. WILLIAMOWSKY, *Primary Examiner.*

DON A. WAITE, *Examiner.*

L. H. GERIN, *Assistant Examiner.*